Dec. 26, 1939.                    R. B. BOURNE                    2,184,891
                                    SILENCER
                              Filed Dec. 13, 1937                4 Sheets-Sheet 1
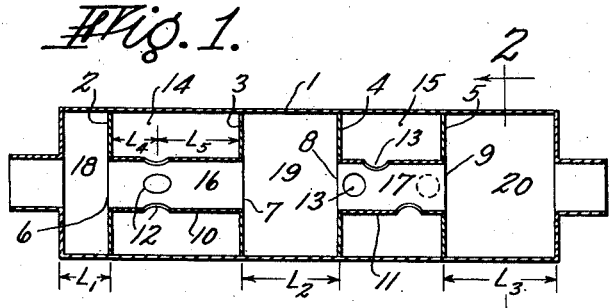
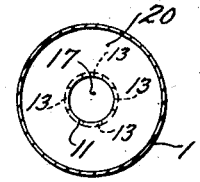
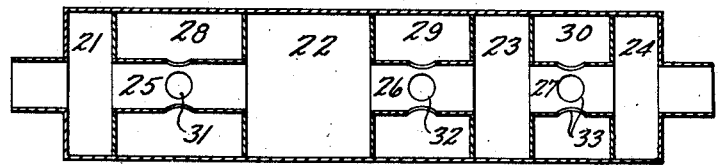
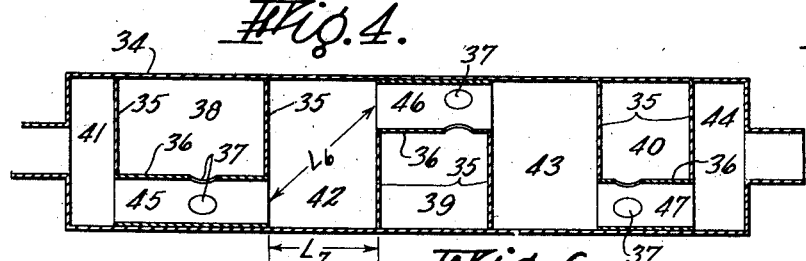
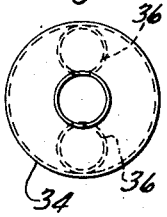
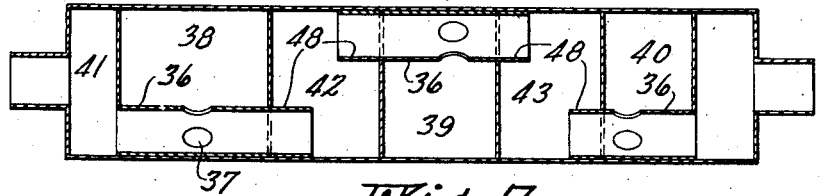
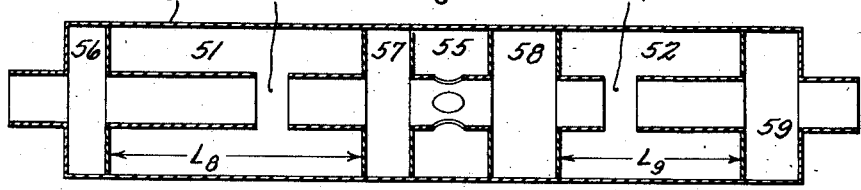
INVENTOR
ROLAND B. BOURNE
BY
Chapin + Neal
ATTORNEYS Dec. 26, 1939.                R. B. BOURNE                 2,184,891
                                SILENCER
                          Filed Dec. 13, 1937          4 Sheets-Sheet 2
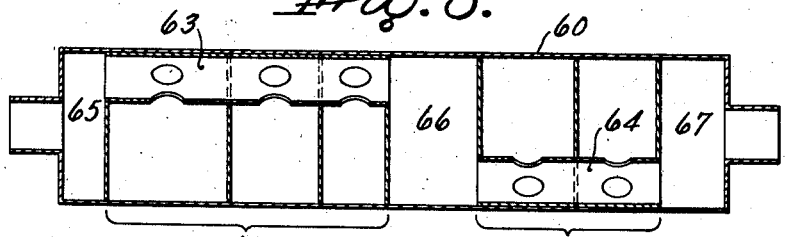
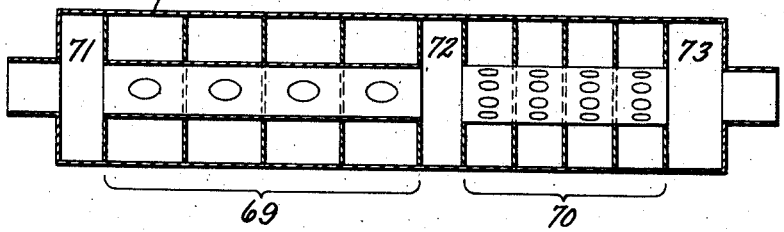
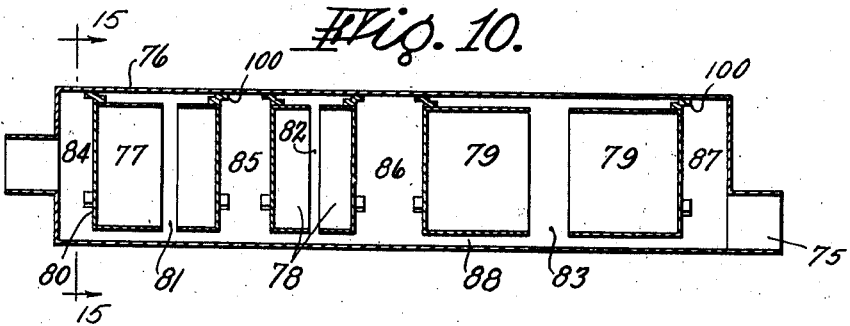
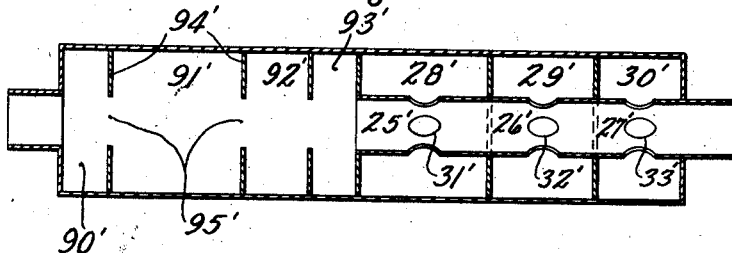
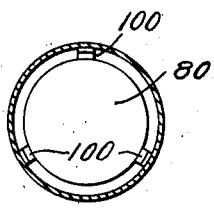
INVENTOR
ROLAND B. BOURNE
BY
*Chapin + Neal*
ATTORNEYS

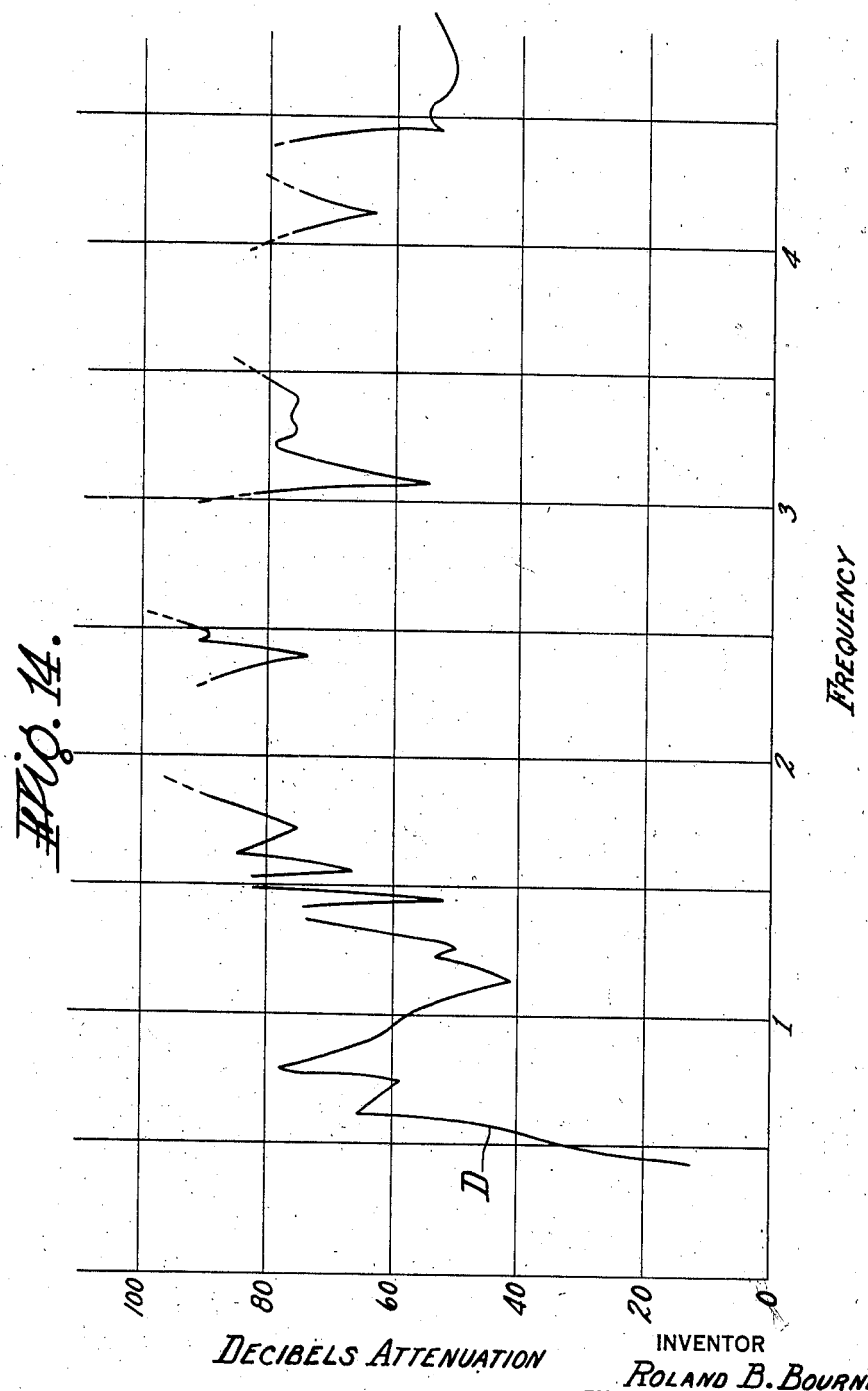

Patented Dec. 26, 1939

2,184,891

UNITED STATES PATENT OFFICE 2,184,891

SILENCER

Roland B. Bourne, West Hartford, Conn., assignor to The Maxim Silencer Company, Hartford, Conn., a corporation of Connecticut Application December 13, 1937, Serial No. 179,414

15 Claims. (Cl. 181—59)

This invention relates to silencers particularly adapted for the exhausts of internal combustion motors, the intakes of air compressors, and the like.

Prior silencers have in general relied upon the absorptive effect on sound waves of various material, upon a somewhat analogous effect produced by tortuous passages or passages of small cross sectional area, upon reactive side branches, or upon combinations of these principles. Sound absorbing material and small passages tend to become clogged by deposits from the exhaust of internal combustion motors, and reactive side branches are selective as to the frequencies to which they respond. The present invention employs reactive side branches, but in a novel manner so that their effectiveness over a wide frequency range is improved.

In accordance with the invention side branches are acoustically coupled to a sound conducting channel at intervals along its length, and the channel is formed between these coupling points with abrupt changes in cross sectional area so that reflection losses of a high order are introduced. The mathematical analysis of the device is so complicated as to be unwieldy, but empirical results show that exceptionally high and uniform attenuation is obtained.

The nature of the invention can best be understood from the illustrative embodiments shown in the accompanying drawings, in which Fig. 1 is a view in median section of one form of the invention;

Fig. 2 is a section on line 2—2 of Fig. 1;

Fig. 3 is a view similar to Fig. 1 showing another form;

Fig. 4 is a view similar to Fig. 1 showing a form utilizing a different arrangement of the main channel;

Fig. 5 is an end view of the device of Fig. 4;

Fig. 6 is a view similar to Fig. 4 showing a still different type of channel having certain acoustic advantages;

Fig. 7 is a view in median section showing the utility of the present invention in combination with other forms of side branches;

Figs. 8, 9 and 10 are views in median section showing other embodiments of the invention;

Fig. 11 is a view in median section showing for comparison purposes a silencer the same in elements and proportion as that shown in Fig. 3, but with the elements differently arranged;

Fig. 14 is a similar graph of the device shown in Fig. 7; and

Fig. 15 is a section on line 15—15 of Fig. 10.

Figure 12:
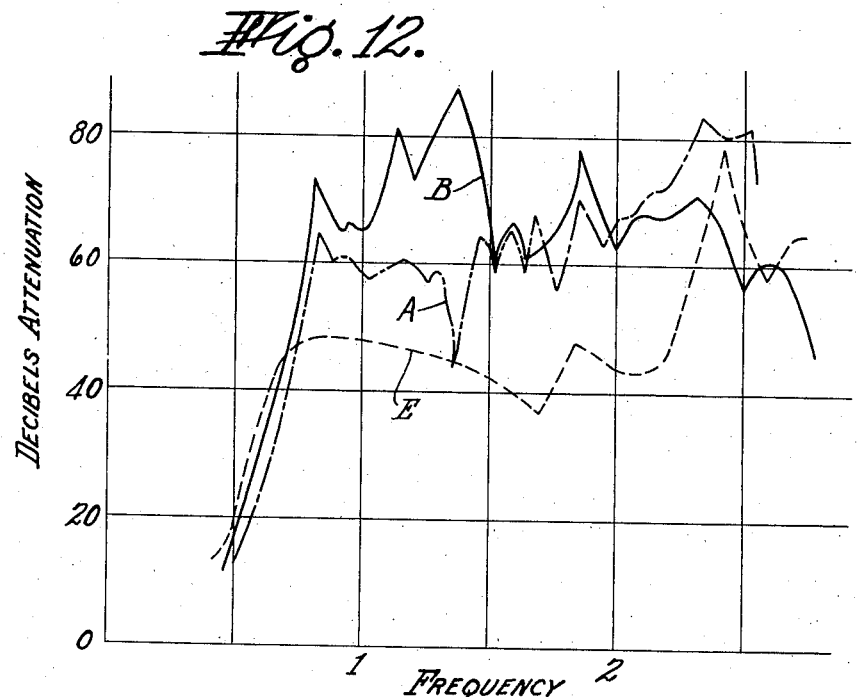
Fig. 12 is an empirical graph showing at A, B and E respectively, the attenuation, throughout the frequency range generally met with, of devices constructed in accordance with Figs. 3, 4 and 11 respectively.

In all the embodiments shown, the silencer is enclosed in an outer shell or housing comprising a preferably cylindrical casing with inlet and outlet opening at its ends. For convenience the term "outer casing" will be used to denote the outer shell together with the end headers and pipe connections.

Figs. 1 and 2 show a device illustrative of the invention comprising an outer casing 1, and transverse partitions 2, 3, 4 and 5, having centrally disposed circular openings 6, 7, 8 and 9 respectively therein. A conduit 10 extends between the opening 6 and the opening 7 and a conduit 11 extends between openings 8 and 9. Conduits 10 and 11 have holes 12 and 13 respectively forming acoustical conductivities opening into the otherwise closed cavities 14 and 15 respectively. It will be seen that there are thus formed two interiorly disposed sections 16 and 17 of the main channel, each having a closed acoustic side branch 14 and 15 coupled thereto; and that these two sections are separated from each other and from the end headers of the outer casing by the series chambers 18, 19 and 20 of lengths $l_1$, $l_2$, and $l_3$, respectively, substantially as shown. The chambers 14 and 15 are preferably proportioned to attenuate different groups of sound frequencies in their respective channels while the chambers 18, 19 and 20 are proportioned to attenuate still different groups of frequencies whereby a continuous, wide band of sound frequencies are offered substantial attenuation. The holes 12 in the conduit 10 are spaced at distances $L_4$ and $L_5$ from headers 2 and 3 respectively. These distances are made unequal so that the series resonant frequencies of the corresponding lengths of the side branch will not coincide. A different method of avoiding series resonance effects in the main channel is shown in connection with the chamber 15 wherein the holes 13 forming the acoustical conductivity thereinto are distributed along the channel 17. This construction results in raising the frequency of maximum attenuation for the side branch, other things being equal, and to compensate therefor, either an increase in volume 15 of the side branch must be made or the conductivity reduced. When the frequency to be attenuated by a given side branch is relatively high, this manner of spacing the holes forming the conductivity is found very useful.

The side branches 14 and 15 act to attenuate sound waves passing along their respective sections 16 and 17 of the main sound conducting channel, and the enlarged sections 18, 19 and 20 of the main sound conducting channel also act to attenuate such waves on account of reflection losses occurring at the points where the cross sectional size of the main sound conducting channel changes abruptly. The frequencies to which these several elements exhibit maximum attenuation can be varied by changing their proportions, and in order to cover a wide band of frequencies it is preferable to have the two side branches different in length and to have the lengths $L_1$, $L_2$, and $L_3$ of the enlarged portions of the main channel also unequal.

It may be noted that as customarily used in the art the term "main sound conducting channel" signifies the conduit through which the sound waves pass in reaching successively the several devices which act upon them. If the sound waves are accompanied by gas flow, as is generally the case, the main channel is also the conduit through which the gas passes from the inlet to the outlet, but gas flow is not essential to the functioning of the device. In the present case the channel is composed of the sections 18, 16, 19, 17 and 20 in series, including of course the bounding walls which determine these inclosures. Similarly the term "side branch" is customarily used to define a chamber, such as 14 or 15, disposed adjacent to the main channel and acoustically coupled to it as by the holes 12 and 13. For ordinary installations where sound is not to escape the side branches are "closed", meaning that they are formed with walls forming a chamber completely closed except at the coupling points. The term of course includes the bounding walls which define the chambers, some of these walls usually being identical with the certain walls defining the main channel. These terms will hereinafter be used in the specification and claims as expressing in convenient form the idea more fully expressed here.

Fig. 3 shows a similar device in which the main channel has enlarged portions 21, 22, 23 and 24 and restricted portions 25, 26 and 27 acoustically coupled to side branches 28, 29 and 30 through holes 31, 32 and 33 forming acoustical conductivities. The several enlarged portions and side branches are preferably of different sizes for the reasons given above. This form of device will be discussed later in comparison with the device of Fig. 11 to more fully explain its functioning.

The form of the invention shown in Figs. 4, and 5 is especially useful when used with sound sources associated with pulsating gas flow such as occurs in the exhaust from internal combustion motors. In this case the reduced sections of the main channel are offset from each other so that the slugs of gas emanating from one cannot impinge directly upon the opening to another, thereby eliminating a tendency to cause the section to "sound off" or to create whistles. The casing 34 is provided with headers 35, alternating pairs of which are connected by tubes 36 arranged eccentrically with respect to the casing as a whole and offset relatively to each other. To give the greatest possible lateral separation the tubes 36 are preferably located in contact with the outer wall of the casing. The tubes are provided with holes 37 opening into the adjacent closed chambers 38, 39 and 40; these chambers being formed by the casing, the partitions and the tubes themselves, and functioning as side branches. Acoustically this device comprises a main channel formed of enlarged sections 41, 42, 43 and 44 connected by reduced sections 45, 46 and 47; the latter being acoustically coupled by the conductivities 37 with the side branches 38, 39 and 40. The attenuation is considerably improved by this type of construction with only slight increase in back pressure. Furthermore, the effective acoustical length $L_6$ across the enlarged sections is greater than the distance $L_7$ which would exist were the tubes 36 in line, resulting in a desirable lowering of the frequency range within which attenuation occurs. Here again the several corresponding elements are preferably made of differing dimensions to cause spreading of their frequency responses, and the conductivities 37 are asymmetrically located to keep series resonance effects at a minimum.

Fig. 12 shows graphs A and B obtained from measurements of devices constructed in accordance with Figs. 3 and 4, the dimensions of the parts being the same except for the eccentricity of the tubes 36 in Fig. 4. Curve A will be discussed in detail below, but the improvement in the lower frequency range due to the construction of Fig. 4 will be readily apparent. It may be noted that in these, as well as other graphs to be considered below, the ordinates represent the overall attenuation of the device, expressed in decibels, and the abscissae represent the frequency of the sound waves. Since the response of the device depends on its size and as the relation between the response at various frequencies is the result to be shown, the abscissae are shown as arbitrary quantities, rather than as definite frequencies.

Figure 13:
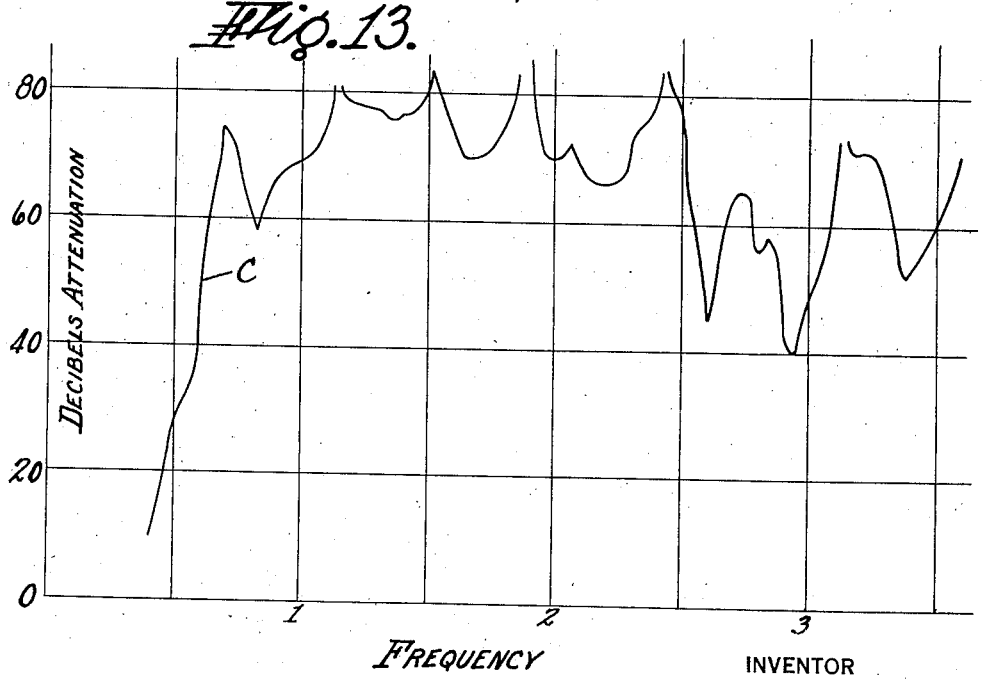
Fig. 13 is a similar graph of the device shown in Fig. 6.

Fig. 6 shows a modification of the structure of Fig. 4 differing only in the fact that the tubes 36 are extended as at 48 into the enlarged portions 42 and 43 of the main channel. The graph shown at C, Fig. 13, shows the change when compared with curve B of Fig. 12. It will be noted from the comparison that the attenuation at low frequencies is greatly improved, the frequency at which 60 decibels attenuation is reached being lowered about twenty per cent for a silencer of the same size. Conversely, for a given lower frequency limit, the size of the silencer may be correspondingly reduced with a consequent saving in cost. This is of considerable commercial importance since low frequencies are of prime importance in many industrial applications and both cost and size generally have to be kept down.

Another embodiment of the invention is shown in Fig. 7 and comprises an outer casing 50 in which are positioned two double linear side branches 51 and 52 of length $L_8$ and $L_9$, respectively. These side branches each have an acoustical conductivity in the form of the wide slots 53 and 54 positioned at a distance equal to ⅔ of $L_7$ and ⅔ of $L_8$ respectively, from one of the end headers forming the side branch, substantially as shown in the drawings. The length $L_9$ is preferably made equal to ¾ $L_8$ so that both of these side branches, each of which consists of two linear traps in parallel, one twice as long as the other, will conspire to provide high attenuation over a wide frequency range. This result is predictable and is fully discussed in my prior Patent 1,910,672, May 23, 1933. One fairly broad region of low attenuation results, however, and a side branch 55 is provided for the purpose of giving attenuation in this region. The three side branches 51, 52 and 55 are all spaced apart within the outer casing 50 by enlargements 56, 57, 58 and 59 of the main channel, each of which is of different length. A typical measured attenuation-frequency characteristic of a silencer built in accordance with the embodiment of Fig. 7 is shown at D in Fig. 14. Again, the average attenuation is above 60 decibels and does not fall below 40 decibels. This embodiment of the invention is well adapted for use on the intakes and discharge of positive pressure blowers and the like where the sound frequency spectrum embraces a very wide range of frequencies.

The principles of the invention may be applied to include the use of groups of side branches positioned within a casing instead of single units as heretofore shown. Fig. 8 shows a silencer having an outer casing 60 and positioned therein the composite side branch groups 61 and 62, each embodying an eccentric main channel, sections 63 and 64 respectively, and being separated along the length of the casing 60 by enlargements 65, 66 and 67. Each of the component side branches of each group is tuned to a different sound frequency. This construction is useful in cases where most of the sound energy is concentrated in the low and intermediate range of frequencies.

Another form of the invention is shown in Fig. 9 wherein the outer casing 68 contains the four section recurrent wave filter 69 and the four section recurrent wave filter 70, these being separated within the casing 68 by the series chambers 71, 72 and 73, as shown. Such a silencer may be designed to offer extremely high attenuation to two widely separately groups of sound frequencies. Any number of filter groups may be positioned within the outer casing.

Fig. 10 shows an embodiment of the invention adaptable to services wherein cooling water from an engine is introduced into the exhaust line between the engine and the silencer. Such a silencer, with an eccentric outlet connection 75 is self-draining as will be evident from the drawing. The device comprises an outer casing 76 and cylindrical sidebranch units 77, 78 and 79 formed by cup-like members 80 suitably supported as by brackets 100 (Fig. 15) in spaced relation to the casing and having respective slot-like acoustical conductivities 81, 82 and 83. These sidebranch units are so positioned in the casing 76 as to be separated longitudinally by the series chambers 84, 85, 86 and 87, as shown. The main channel 88 between the series chambers is seen to be annular in form, being defined by the inside of the casing 76 and the outside of the members 80. Silencers constructed along the above lines are readily designed to attenuate any frequency or band of frequencies desired.

It has been pointed out above that the attenuating action of the enlarged sections of the main channel is in part due to the introduction of reflection losses at the points where the cross section of the main channel changes. There are two such points in every enlargement, one where the cross section increases and one where it decreases. Reflection losses have previously been utilized to attenuate sound waves in mufflers of the baffle plate type, but the present type of design offers advantages, both from the standpoint of acoustical efficiency and compactness as compared with anything previously proposed.

In order to determine the nature of the interaction between the reflective and reactive components a comparison silencer was constructed in accordance with Fig. 11 on the same scale as the silencer of Fig. 3. The main channel sections 25', 26', and 27' are the same in proportion as corresponding unprimed parts in Fig. 3, but have been placed side by side instead of being separated by the main channel enlargements. The sidebranches 28', 29' and 30', and the conductivities 31', 32' and 33' are likewise unchanged from the corresponding unprimed parts. The main channel enlargements 21, 22, 23 and 24 of Fig. 3, have, however, been replaced by chambers 90, 91, 92 and 93 of similar sizes formed by annular partitions 94 having holes 95 through their centers, the same size as the restricted portions 25, 26 and 27 of the main channel.

A plot of the performance of a silencer so constructed is shown at E in Fig. 12. This silencer is of the same size and has the same sized channel sections and sidebranches, but they are differently arranged and obviously function very differently, the silencer of Fig. 3 having from fifteen to twenty decibels more attenuation in the useful frequency range. The explanation of this fact is obscure, but it is apparent that a wholly new type of action results when the main channel enlargements are interspersed between the sidebranches; or, conversely, when the main channel sections between the enlargements are extended and loaded by coupling sidebranches to them. The degree of attenuation is not of itself a measure of the efficiency of the device except when considered in connection with the size of the device. The attenuation curve could thus be raised by adding more sections to the device, or the low frequency response by increasing the size of the sections. The importance of the present comparison is that curve E has been raised to curve A by a mere rearrangement of parts of equal size within the same enclosing casing.

I claim:

1. A silencer comprising a conduit forming a main sound conducting channel and having abrupt changes in cross sectional area forming alternating sections of large and of small cross sectional area, and closed acoustic side branches acoustically coupled to said channel at the sections of smaller area, the portions of the conduit of small cross sectional area being substantially displaced from alignment with each other and extending a substantial distance into the sections of larger cross sectional diameter.

2. A silencer comprising a cylindrical casing having inlet and outlet connections at its ends, a plurality of spaced partitions extending across the interior of the casing to divide it into cylindrical sections, and tubular members leading between and through certain pairs only of adjacent partitions, said tubular members being formed with apertures leading into those chambers formed within the casing by the partitions between which they extend, whereby the tubular members and those chambers formed within the casing between those adjacent partitions not connected with tubular members define a main sound conducting channel, and those chambers defined by the exterior of each tubular member, the partitions between which it extends, and the interior of the casing between said partitions form side branches acoustically coupled to the main channel through said apertures, certain of the side branches being separated from certain other of the sidebranches by the enlarged sections of the main channel formed within the casings between those adjacent partitions not connected by a tubular member.

3. A silencer comprising a cylindrical casing having inlet and outlet connections at its ends, a plurality of spaced partitions extending across the interior of the casing to divide it into cylindrical sections, and tubular members leading between and through certain pairs only of adjacent partitions eccentrically disposed with respect to the casing and substantially displaced from alignment with each other, said tubular members being formed with apertures leading into those chambers formed within the casing by the partitions between which they extend; whereby the tubular members and those chambers formed within the casing between those adjacent partitions not connected with tubular members define a main sound conducting channel having offset portions between the successive tubular members to avoid beam transmission through them, and those chambers defined by the exterior of each tubular member, the partitions between which it extends, and the interior of the casing between said partitions define side branches acoustically coupled to the main channel through said apertures, certain of the side branches being separated from certain other of the side branches by the enlarged sections of the main channel formed within the casing between those adjacent partitions not connected by a tubular member.

4. A silencer comprising a cylindrical casing having inlet and outlet connections at its ends, a plurality of spaced partitions extending across the interior of the casing to divide it into cylindrical sections, and tubular members leading between, through, and substantially beyond certain pairs only of adjacent partitions, said members being eccentrically disposed with respect to the casing and substantially displaced from alignment with each other, said tubular members being formed with apertures leading into those chambers formed within the casing by the partitions between which they extend; whereby the tubular members and those chambers formed within the casing between those adjacent partitions not connected with tubular members define a main sound conducting channel having enlargements between successive tubular members into which said members extend, and those chambers defined by the exterior of each tubular member, the partitions between which it extends, and the interior of the casing between said partitions define sidebranches acoustically coupled to the main channel through said apertures, certain of the sidebranches being separated from certain other of the sidebranches by the enlarged sections of the main channel formed within the casing between those adjacent partitions not connected by a tubular member.

5. A silencer comprising a cylindrical casing having inlet and outlet connections at its ends, and a series of cylindrical boxes open at one end and of less diameter than the interior of the casing supported within the casing in spaced relation thereto and arranged in pairs with their open sides facing but separated, the successive pairs being substantially separated from each other along the length of the casing, whereby the annular space between the exterior of the cylindrical boxes and the interior of the casing, and the chambers formed within the casing between successive pairs of boxes form a main sound conducting channel and the interior of the boxes form sidebranches acoustically coupled to the main channel through the slot-like opening between the separated cylindrical walls of the two boxes of each pair.

6. A silencer comprising a cylindrical casing, a series of annularly slotted but otherwise closed chambers spaced apart within the casing to form a second series of chambers within the casing, the chambers of one set alternating with the chambers of the second set, the chambers of the first set being spaced radially inwardly from the cylindrical wall of the casing to form annular conduits connecting the chambers of the second set.

7. A muffler comprising a casing, a plurality of spaced baffle plates secured to the inner surface of said casing and affording a plurality of expansion chambers, and a plurality of perforated conduits disposed within said casing and extending only partially therethrough, each of said conduits extending through a plurality of said baffle plates for permitting the gases to pass into the expansion chambers, the adjacent ends of said conduits being spaced from one another longitudinally of said casing, and at least one of said conduits being offset with respect to an adjacent pair of conduits for providing a sinuous path for the gases through the muffler casing.

8. A muffler comprising a casing, a plurality of spaced baffle plates secured to the inner surface of said casing and affording a plurality of expansion chamber, a pair of perforated end conduits disposed within said casing and extending through a plurality of said baffle plates at each end of said casing for permitting the passage of gases into the expansion chambers defined by said baffle plates, the inner ends of said end conduits being substantially spaced from one another longitudinally of said casing, and a central conduit disposed within said casing in the space between the inner ends of said end conduits and offset with respect to the said end conduits for providing a sinuous path for the gases, said central conduit extending through baffle plates disposed in the intermediate portion of said casing and being perforated to permit the passage of gases into expansion chambers defined by said baffle plates.

9. A silencer comprising a plurality of chambers arranged in two sets so that the chambers of one set alternate with the chambers of the second set, and a plurality of conduits each connecting two consecutive chambers of one set and opening laterally into a chamber of the second set.

10. A silencer comprising a plurality of chambers arranged in two sets so that the chambers of one set alternate with the chambers of the second set, and a plurality of conduits each connecting two consecutive chambers of one set and disposed eccentrically within and opening laterally into a chamber of the second set, successive conduits being substantially displaced from alignment with each other.

11. A silencer comprising a plurality of chambers arranged in two sets so that the chambers of one set alternate with the chambers of the second set, and a plurality of conduits each connecting two consecutive chambers of one set and extending a substantial distance therein, said conduits each being disposed eccentrically within and opening laterally into a chamber of the second set.

12. A muffler comprising a casing, a plurality of spaced baffle plates secured to the inner surface of said casing and affording a plurality of expansion chambers, a pair of perforated conduits disposed within said casing and extending through a plurality of said baffle plates at each end of said casing for permitting the passing of gases into the expansion chambers defined by said baffle plates, said end conduits being disposed in axial alignment and the inner ends thereof being substantially spaced from one another longitudinally of said casing, and a central perforated conduit disposed within said casing in the space between the inner ends of said end conduits and offset with respect to the axes of said end conduits for providing a sinuous path for the gases through the muffler casing, said central conduit extending through baffle plates disposed in the intermediate portion of said casing for permitting the passage of gases into the expansion chambers defined by said baffle plates.

13. A silencer comprising a casing having an inlet at one end and an outlet at the other, a plurality of transverse wall members positioned in spaced relation along the interior of the casing, conduit-defining members extending between certain of the transverse wall members and in conjunction therewith defining chambers of less cross-sectional area than that of the casing, the conduits defined by said members extending past said chambers and being laterally apertured to connect with said chambers, the chambers formed between those of the transverse walls not connected by the conduit-defining members being of substantially the same cross-sectional area as that of the casing and being interspersed between said chambers of less cross-sectional area.

14. A silencer comprising a casing having an inlet at one end and an outlet at the other, a plurality of transverse wall members positioned in spaced relation along the interior of the casing, conduit-defining members extending between certain of the transverse wall members and in conjunction therewith defining chambers of less cross-sectional area than that of the casing, the conduits defined by said members extending past said chambers and being successively positioned out of line one with respect to another, said conduits being laterally apertured to connect with said chambers, the chambers formed between those of the transverse walls not connected by the conduit-defining members being of substantially the same cross-sectional area as that of the casing, being interspersed between said chambers of less cross-sectional area, and being connected one with another of said conduits.

15. A silencer comprising a casing having an inlet at one end and an outlet at the other, a plurality of transverse wall members positioned in spaced relation along the interior of the casing, conduit-defining members each extending between and through a plurality of the transverse wall members and in conjunction therewith defining groups of chambers of less cross-sectional area than that of the casing, and defining conduits each extending past one of said groups of chambers and being laterally apertured to connect with each chamber of the group, the chambers formed between those of the transverse walls not connected by the conduit-defining members being of substantially the same cross-sectional area as that of the casing, being interspersed between said chambers of less cross-sectional area, and being connected one with another by said conduits.

ROLAND B. BOURNE.